(12) United States Patent
Weibling et al.

(10) Patent No.: US 7,866,700 B2
(45) Date of Patent: Jan. 11, 2011

(54) MACHINE FRAME (75) Inventors: Danny L. Weibling, Metamora, IL (US); Adam C. Grove, East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 333 days.

(21) Appl. No.: 12/029,089

(22) Filed: Feb. 11, 2008

(65) Prior Publication Data
US 2009/0200785 A1 Aug. 13, 2009

(51) Int. Cl.
B62D 21/00 (2006.01)

(52) U.S. Cl. .................... 280/781; 280/785; 180/299; 180/311; 180/312; 296/203.01

(58) Field of Classification Search ............ 280/781, 280/785, 793, 794, 795, 796, 797; 180/299, 180/311, 312; 296/203.01
See application file for complete search history.

(56) References Cited

U.S. PATENT DOCUMENTS

| | | | | |
|---|---|---|---|---|
| 3,645,350 A * | 2/1972 | Deli et al. | ...................... | 180/9.1 |
| 3,825,074 A * | 7/1974 | Stedman et al. | ............. | 172/827 |
| 3,873,148 A * | 3/1975 | Kennicuit | .................. | 280/781 |
| T966,007 I4 * | 1/1978 | Liehr et al. | .................. | 280/797 |
| 4,189,010 A * | 2/1980 | Meisel, Jr. | ................... | 172/822 |
| 4,230,199 A * | 10/1980 | Stedman | ...................... | 180/9.1 |
| 4,281,721 A * | 8/1981 | Beales | ........................ | 172/821 |
| 4,919,212 A * | 4/1990 | McClure | ..................... | 172/274 |
| 4,962,816 A * | 10/1990 | Imon et al. | ................... | 172/821 |
| 5,429,037 A * | 7/1995 | Weber et al. | ................... | 91/522 |
| 5,620,053 A * | 4/1997 | Kamikawa et al. | ............. | 172/4 |
| 5,823,569 A * | 10/1998 | Scott | .......................... | 280/781 |
| 5,848,807 A | 12/1998 | Dubay et al. | | |
| 6,098,870 A * | 8/2000 | Deneve et al. | .............. | 228/182 |
| 6,167,980 B1 * | 1/2001 | Anderson et al. | ........... | 180/311 |
| 6,260,642 B1 * | 7/2001 | Yamamoto et al. | .......... | 180/6.7 |
| 6,293,364 B1 * | 9/2001 | Anderson et al. | ........... | 180/312 |
| 6,330,778 B1 * | 12/2001 | Jakobsson | .................... | 52/837 |
| 6,575,262 B2 * | 6/2003 | Nagatsuka | ................... | 180/312 |
| 7,182,369 B2 * | 2/2007 | Baumann et al. | ............ | 280/781 |
| 7,293,375 B2 * | 11/2007 | Fukushima et al. | .......... | 37/397 |
| D567,259 S * | 4/2008 | Davis | ......................... | D15/24 |
| 7,503,623 B2 * | 3/2009 | Favaretto | ............... | 296/203.01 |
| 2002/0079144 A1 * | 6/2002 | Suzuki et al. | ................ | 180/6.7 |
| 2002/0134560 A1 * | 9/2002 | Okada et al. | ................ | 172/831 |
| 2003/0015488 A1 * | 1/2003 | Forsyth | ....................... | 212/258 |
| 2004/0026153 A1 * | 2/2004 | Dershem et al. | ............ | 180/311 |
| 2005/0167129 A1 * | 8/2005 | Suzuki et al. | ............... | 172/819 |
| 2005/0167969 A1 * | 8/2005 | Fukazawa et al. | ........... | 280/785 |
| 2006/0001250 A1 * | 1/2006 | Fukazawa et al. | ........... | 280/781 |
| 2007/0056786 A1 * | 3/2007 | Fukazawa et al. | ........ | 180/89.12 |
| 2007/0062742 A1 * | 3/2007 | Fukazawa et al. | ........ | 180/24.04 |
| 2007/0071587 A1 * | 3/2007 | Baumann et al. | ............ | 414/680 |
| 2008/0169633 A1 * | 7/2008 | Gabbianelli et al. | ......... | 280/781 |
| 2009/0033127 A1 * | 2/2009 | Duerr et al. | ............ | 296/203.01 |

* cited by examiner

*Primary Examiner*—Paul N. Dickson
*Assistant Examiner*—Barry Gooden, Jr.
(74) *Attorney, Agent, or Firm*—Richard K. Chang (57) ABSTRACT

A frame for a machine may include a load transfer member attached to a load support member and to a first plate member and a second plate member. Additionally, the first and second plate members may each include an aperture shaped to receive a trunnion. The load transfer member may be disposed proximate to the apertures.

18 Claims, 7 Drawing Sheets

MACHINE FRAME

CROSS-REFERENCED TO RELATED APPLICATIONS

This application claims the benefit of U.S. application Ser. No. 12/028,787 filed Feb. 9, 2008.

TECHNICAL FIELD

This invention relates generally to a frame of a machine and more particularly to the frame of a construction machine.

BACKGROUND

Some machines of all types have a main frame that will be able with stand extremely high forces. These forces are generated from the movement of the machine over uneven and/or rugged terrain. These forces can also be generated from the loading of various implements that may be available for use with the machine. This loading of an implement can include uneven loading of the implement, as well as, impulse loading of the implement. All of these forces impart various types of loading to the frame. Consequently, the frame of a particular type of machine is designed to handle the specific forces normally encountered by that particular type of machine. Thus, frames are specially designed such that one configuration of a particular type of machine may not be refitted to another configuration.

The present invention is directed to overcoming one or more of the problems as set forth above.

SUMMARY OF THE INVENTION

In one example of the present invention, a frame for a machine is provided. The frame may include a load transfer member attached to a load support member and to a first plate member and a second plate member. Additionally, the first and second plate members may each include an aperture with the load transfer member disposed proximate to the apertures.

A method may provide for converting a frame configured for use with a standard push arm system to a frame configured for use with a variable pitch power angle and tilt blade system. The method may include providing a frame and providing an aperture shaped to receive a trunnion in the frame proximate to a load transfer member. The trunnion may be shaped to receive a variable pitch power angle and tilt blade system. The method may also include attaching the trunnion to the aperture.

DETAILED DESCRIPTION

Figure 1:
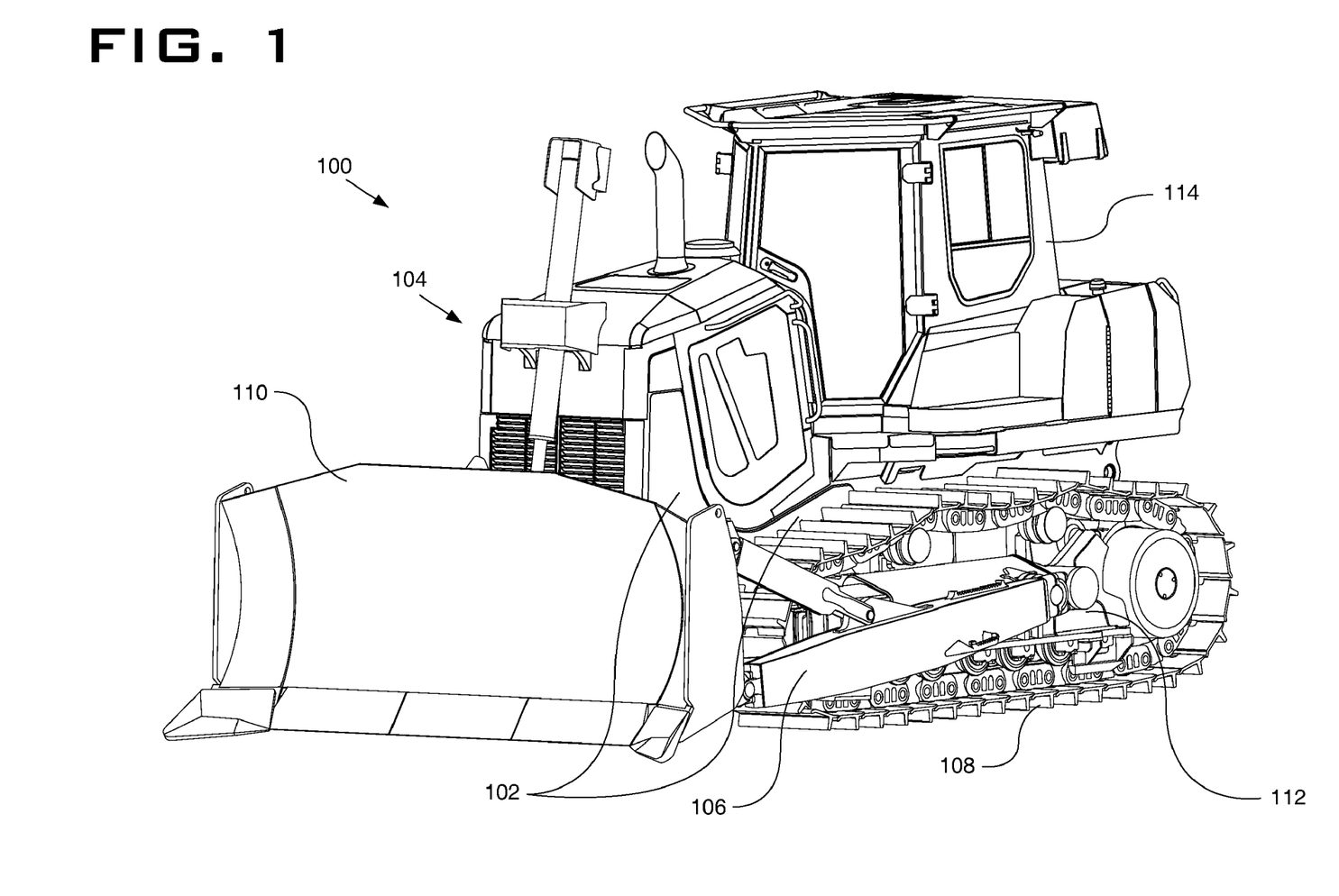
FIG. 1 is a perspective view of a machine having a frame.

Referring to FIG. 1, a perspective view illustrates a machine 100 having a frame 102. The machine 100 is shown, for example, as being a track type tractor 104 provided with a standard push arm system or configuration with a pair of push arms 106 extending on the outside of a pair of endless tracks 108 to an implement 110 and being entrained about a track roller frame 112. However it should be understood that the machine 100 may also be, for example, a compactor, wheeled dozer, a skidder, wheel loader, tracked loader, or any other machine known to one skilled in the art. Alternatively, the implement 110 may be a bucket, a blade, or be attached to another system such as a variable pitch power angle and tilt blade system commonly referred to as a VPAT configuration. The machine 100 may also include a cab 114 or a roll over protection system or ROPS (not shown).

Figure 2:
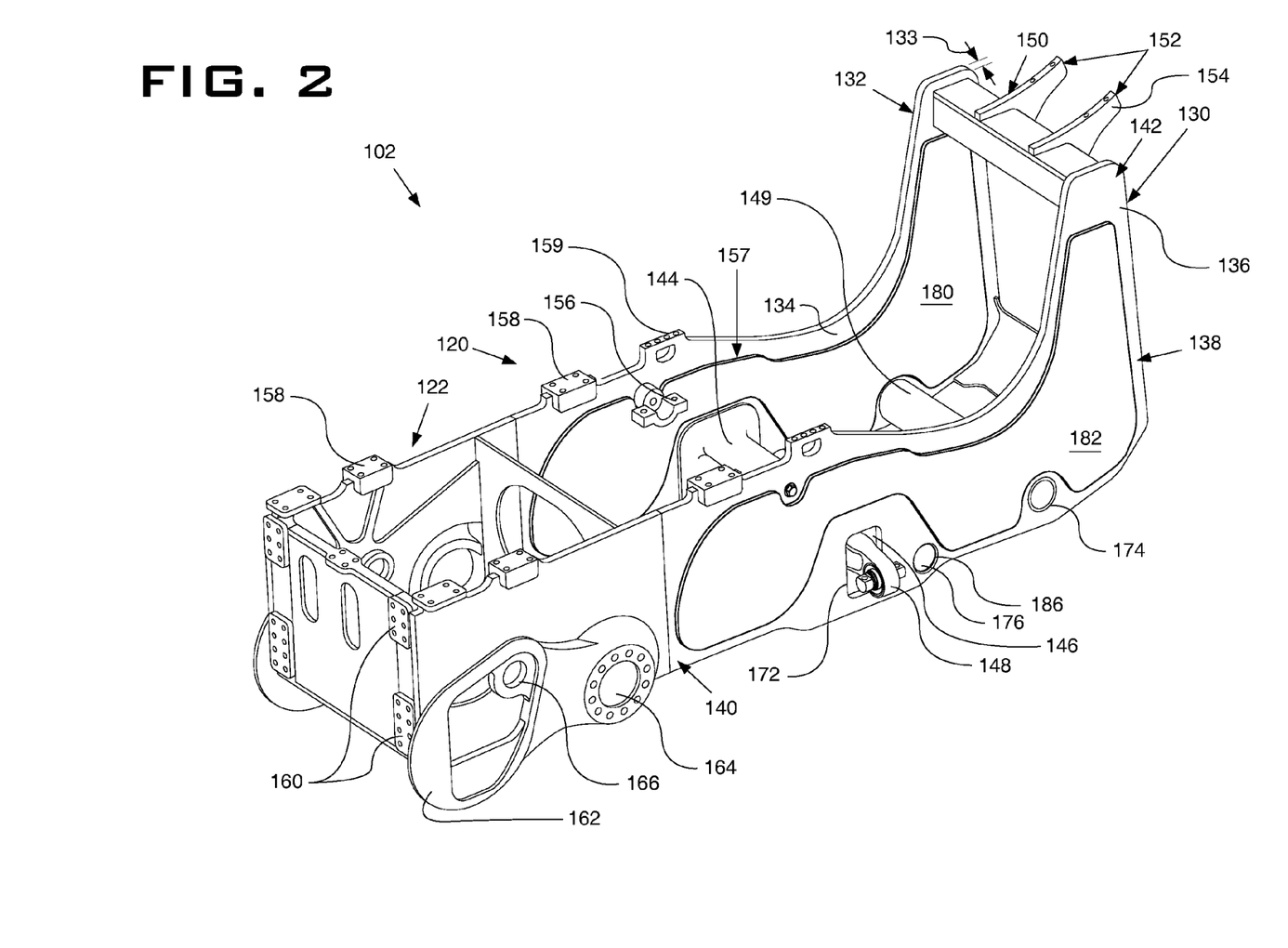
FIG. 2 is a perspective view of the frame.

Referring to FIG. 2, a perspective view illustrates the frame 102. As shown, the frame 102 includes a first section 120 and a second section 122. The first section 120 may be used to support an engine and/or radiator (not shown), as well as receive loads from the implement 110 (FIG. 1), and track roller frame 112. The second section 122 may be used to support a power train such as, a transmission (not shown), electric motors and generator (not shown), pumps (not shown), or other such components known in the art.

The first and second sections 120,122 may be manufactured from steel plate, cast materials, and/or composite materials. Additionally, the first and second sections 120,122 may be welded together and/or attached by adhesives or fasteners.

The first section 120 includes a first plate member 130 and a second plate member 132. As shown, the first and second plate members 130,132 may be made of substantially solid plate having a predetermined thickness 133 that includes an inner side 134 and an outer side 136. Additionally, the first and second plate members 130,132 each include a front portion 138 and a rear portion 140. The front portions 138 may each be shaped to provide an upward extension 142 that extends above the rear portions 140.

As shown, the first and second plate members 130,132 may be secured together in lateral spaced, parallel relationship to one another. In the example shown, each of the first and second plate members 130,132 are mirror images of each other and therefore, a description of one of the first and second plate members 130,132 may apply to both with only one being described in detail below.

The first and second plate members 130,132 may be connected together by a load support member 144 attached to the inner sides 134 of the first and second plate members 130,132. The load support member 144 may be used to support loads in the frame 102 transferred from the track roller frame 112 and the implement 110.

In configurations where the frame 102 is used in a track type tractor, the load support member 144 may be commonly referred to as an "equalizer bar saddle." The load support member 144 may define a generally straight channel 146. As shown, an equalizer bar 148 may extend through the channel 146 and may be connected to the load support member 144.

A brace member 149 may also be interposed between and attached to the inner side 134 of the first and second plate members 130,132. The brace member 149 may be a hollow tube and may be used to support an engine and/or radiator (not shown), as well as providing additional structural stability.

Additionally, a cross member 150 may be attached to the upward extensions 142 of the first and second plate members 130,132. In addition to connecting the first and second plate members 130,132 and providing additional structural stability, the cross member 150 may be used to support loading from the implement 110. Specifically in the configuration shown in FIG. 1, the cross member 150 may include a hydraulic cylinder mount 152. More specifically, the hydraulic cylinder mount 152 may be centrally located on the cross member 150 and may include a pair of forward projecting arms 154.

The first section 120 may also include at least two engine mounts 156 and a plurality of roll over protection mounts 158. The engine mounts 156 may be pivotally attached to the first and second plate members 130,132 in order to facilitate mounting of an engine (not shown) to the first section 120 of the frame 102. Consequently, the first section 120 of the frame 102 may define a portion of the engine compartment 157 of the machine 100 and thus may also include rear hood supports 159.

The second section 122 may include additional roll over protection mounts 158, ripper mounts 160, final drive mounts 162, pivot shaft mounts 164, output shaft bores 166, and other features known in the art. In some configurations of a frame, cab mounts (not shown) may be provided in addition to the roll over protection mounts 158. However, in the configuration shown in FIG. 2, the roll over protection mounts 158 may also support the cab 114 (FIG. 1).

Figure 3:
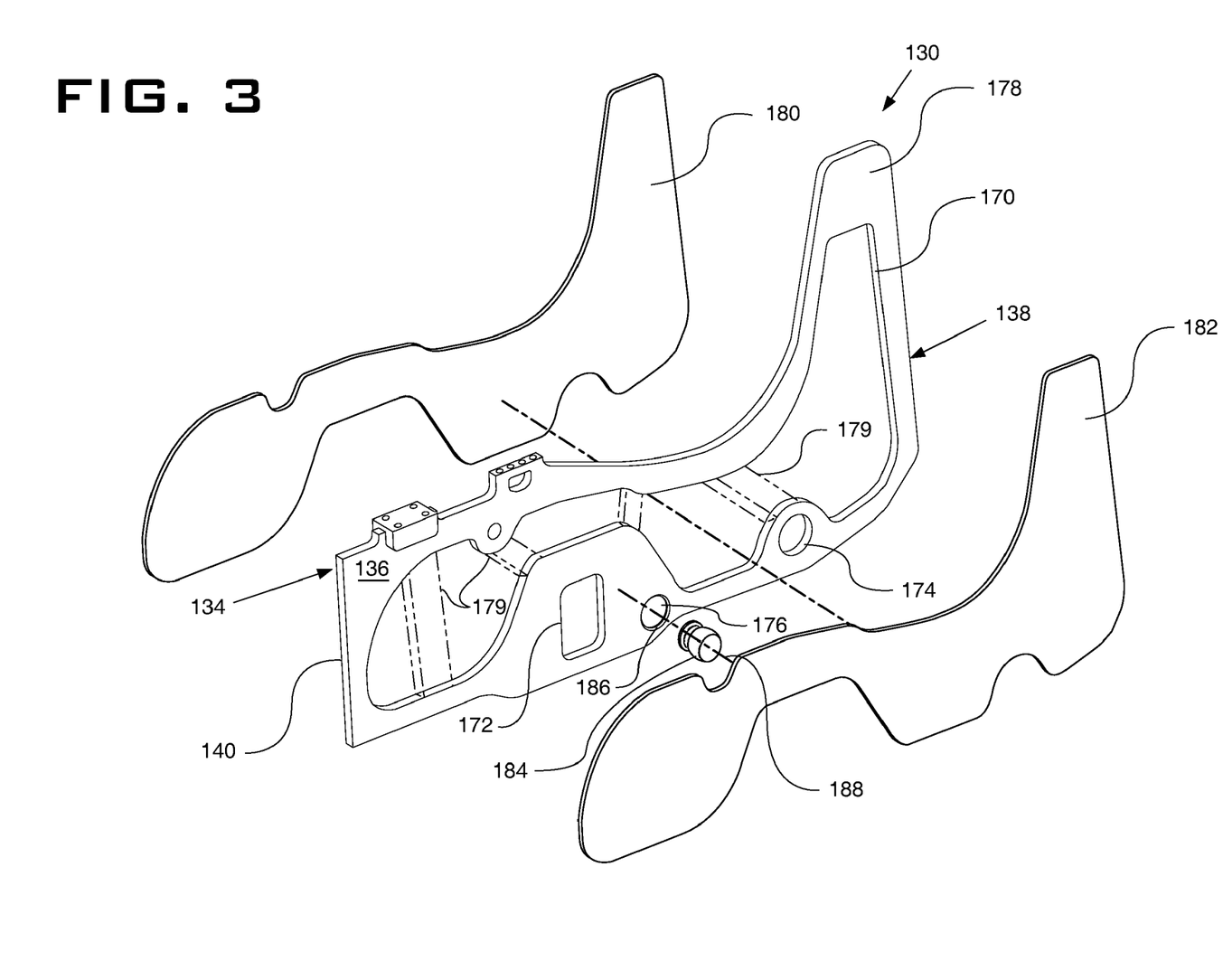
FIG. 3 is an exploded view of the first plate member.

Referring to FIG. 3, an exploded view illustrates the first plate member 130 and shows a mirror image of the second plate member 132. For clarity, the first plate member 130 is described in detail. However, the reference numbers discussed in regard to FIG. 3 also apply to the second plate member 132.

As shown, the first plate member 130 may include a first opening 170 extending from the inner side 134 to the outer side 136, a second opening 172, a third opening 174, and an aperture 176.

The first opening 170 may extend from proximate the rear portion 140 to proximate the front portion 138. In some configurations, the first opening 170 may also extend proximate an upper portion 178 of the upward extension 142. Thus in some configurations, the area of the first opening 170 in the outer side 136 of the first plate member 130 is more than thirty percent of the total area of the outer side 136 of the solid plate of the first plate member 130. In other configurations, the area of the first opening 170 in the outer side 136 of the first plate member 130 is more than forty percent of the total area of the outer side 136 of the solid plate of the first plate member 130. While in other configurations, the first opening 170 may have an area that is larger than the remaining area of the outer side 136 of the solid plate of the first plate member 130. Consequently, the first opening 170 may provide significant weight savings to the frame 102 of several hundred pounds. However, it should be recognized that the first plate member 130 may not include the first opening 170.

Additionally, the first opening 170 may be comprised of a plurality of smaller openings 177 separated by support material and/or struts and/or gussets (referred to herein as "support material") 179. The support material may be positioned to provide additional support for loading of the engine mounts 156 and Roll over protection mounts 158 and other load regions recognized by those of skill in the art.

To provide additional stiffness and structural integrity, the first section 120 of the frame 102 may include an inner cover plate 180 attached to the inner side 134 of the first plate member 130 in overlying relation to the first opening 170. Additionally, an outer cover plate 182 may be attached to the outer side 136 of the first plate member 130 in overlying relation to the first opening 170. Hence, the first plate member 130, the inner cover plate 180, and the first outer cover plate 182 may cooperate to define a substantially hollow section.

The second opening 172 may be shaped to connect with the channel 146 of the load support member 144 (FIG. 2) and thus, the second opening 172 may be disposed to permit the equalizer bar 148 (FIG. 2) to be positioned through and extend beyond the first plate member 130.

The third opening 174 may be shaped to receive an end of the brace member 149 and permit the brace member 149 to be attached to the first plate member 130.

The aperture 176 may be shaped to receive a trunnion 184 and may include a chamfer 186 to facilitate installation and attachment of the trunnion 184. The aperture 176 may be a through hole or a blind hole in the first plate member 130. The aperture 176 and trunnion 184 may include a central axis 188.

Depending on the configuration of the machine 100, the trunnion 184 may not be installed. Specifically, the trunnion 184 may be shaped for connecting an alternative implement such as a variable pitch power angle and tilt blade configuration (not shown) to be attached directly to the frame 102.

Figure 4:
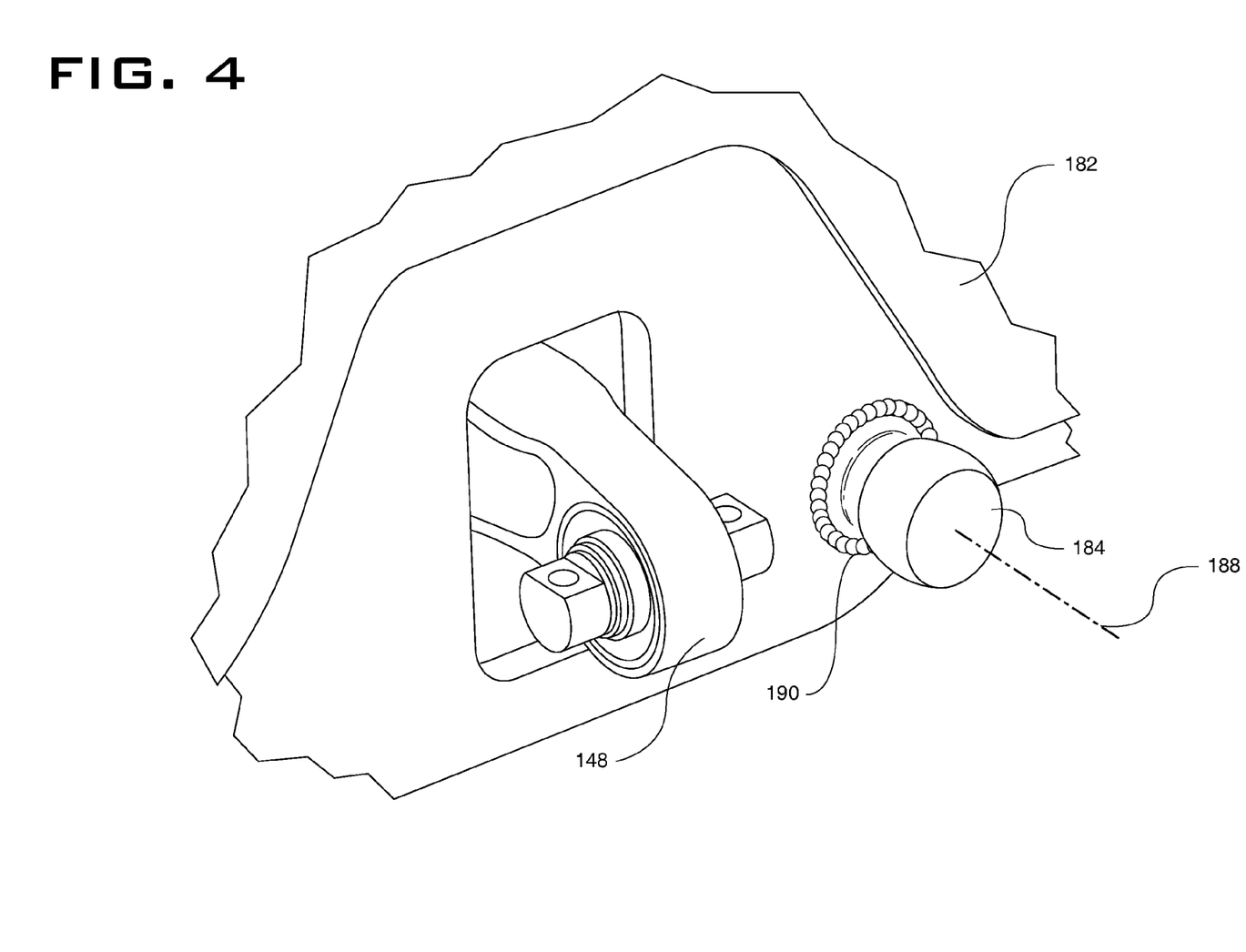
FIG. 4 is a broken view of the trunnion attached to the first plate member.

Referring to FIG. 4, a broken view illustrates that the trunnion 184 may be attached to the first plate member 130. A method of attachment may include providing the aperture 176, disposing the trunnion 184 in the aperture 176, and tack welding the trunnion 184 in place. Next, the trunnion 184 may be fully welded to the first plate member 130 such that the chamfer 186 is filled with weld material 190 as shown.

Figure 5:
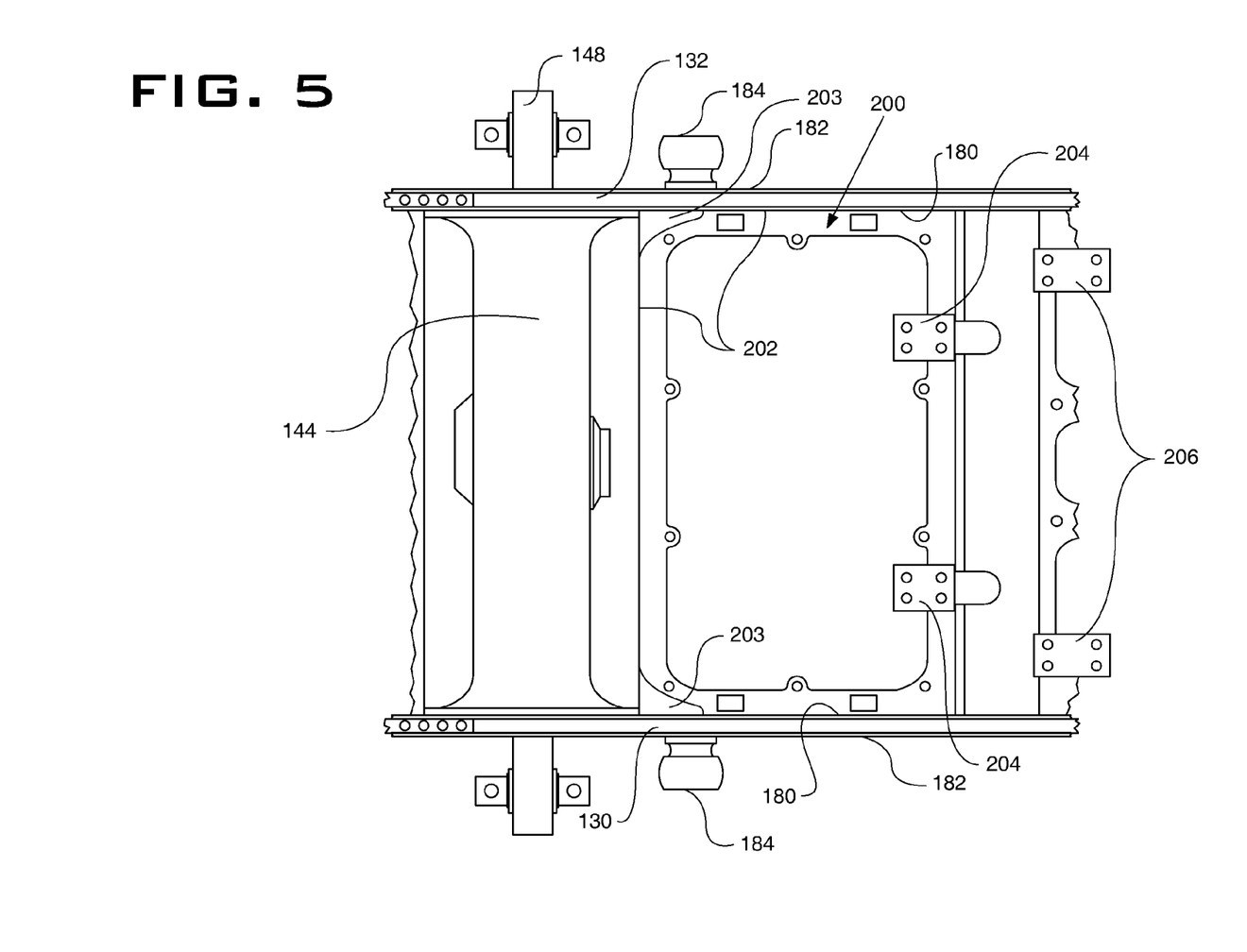
FIG. 5 is a top view of the frame.

Referring to FIG. 5, a top view illustrates the frame 102 and more specifically, shows a load transfer member 200 attached to the load support member 144 and attached to the inner sides 134 of the first and second plate members 130,132. The load transfer member 200 may be disposed to transfer load through the trunnion 184 and the first and second plate members 130,132 to the load support member 144. In some configurations, the load transfer member 200 may be welded around its entire outer edge 202 to the load support member 144, the first and second plate members 130,132, and the brace member 149. The load transfer member 200 may also provide a mounting surface for a bottom guard (not shown) of the machine 100.

The load transfer member 200 may also include gussets 203 to increase the load transferring capacity of the load transfer member 200. The gussets 203 may be positioned proximate the trunnions 184 and may be attached to the load support member 144 and to one of the first and second plate members 130,132.

As shown in FIG. 5 only, the brace member 149 may include engine mounts 204 and radiator mounts 206. Additionally, a first trunnion 184 and a second trunnion 184 may be respectively disposed in and attached to the apertures 176 of the first and second plate members 130, 132. More specifically, the aperture 176 and the trunnion 184 in the first plate member 130 and the aperture 176 and the trunnion 184 in the second plate member 132 may be disposed opposite or in close proximity to the load transfer member 200. In configurations where the apertures 176 are a through hole, the trunnions 184 may be attached, i.e. welded, directly to the load transfer member 200. By positioning the load transfer member 200 proximate to or in line with the apertures 176 and trunnions 184, flexure of the frame 102 when loads are applied to the trunnions 184 may be minimized and thus, may lead to extended life of the frame 102.

Figure 6:
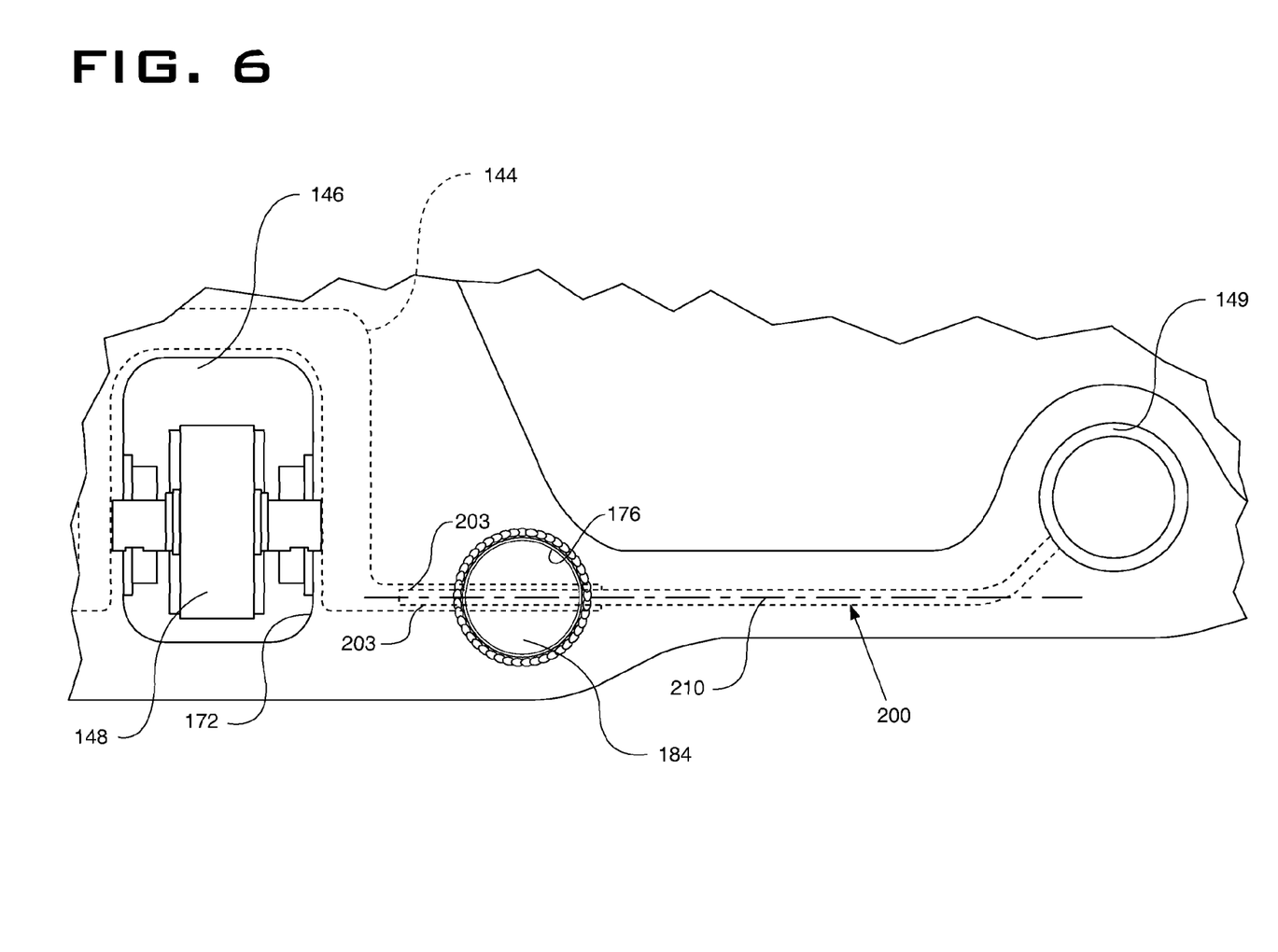
FIG. 6 is a side view illustrating the position of the load transfer member with respect to the aperture and the trunnion.

Referring to FIG. 6, a side view illustrates the positioning of the load transfer member 200 (shown in phantom) with respect to the aperture 176 and the trunnion 184. As shown, the load transfer member 200 may abut and be attached to the load support member 144 and the brace member 149. Further, the load transfer member 200 may optionally include an upper and a lower gusset 203. The upper and lower gussets 203 may be attached or welded to the load support member 144, the load transfer member 200, and one of the first and second plate members 130, 132. In some configurations, the upper and a lower gusset 203 may be attached to the trunnion 184.

Additionally, the load transfer member 200 may define a central plane 210 that may be proximate to and, in some configurations, intersect with the central axis of the aperture 176 and trunnion 184. Additionally, the aperture 176 may be disposed forward of the load support member 144.

In this configuration, the loads placed on the trunnions 184 may be withstood and transferred through the load transfer member 200 and the first and second plate members 130, 132 to the load support member 144 while obtaining the weight savings provided by the first openings 170 in the first and second plate members 130, 132.

Also shown, the channel 146 of the load support member 144 may be generally straight and connects the second opening 172 in the first and second plate members 130, 132.

Figure 7:
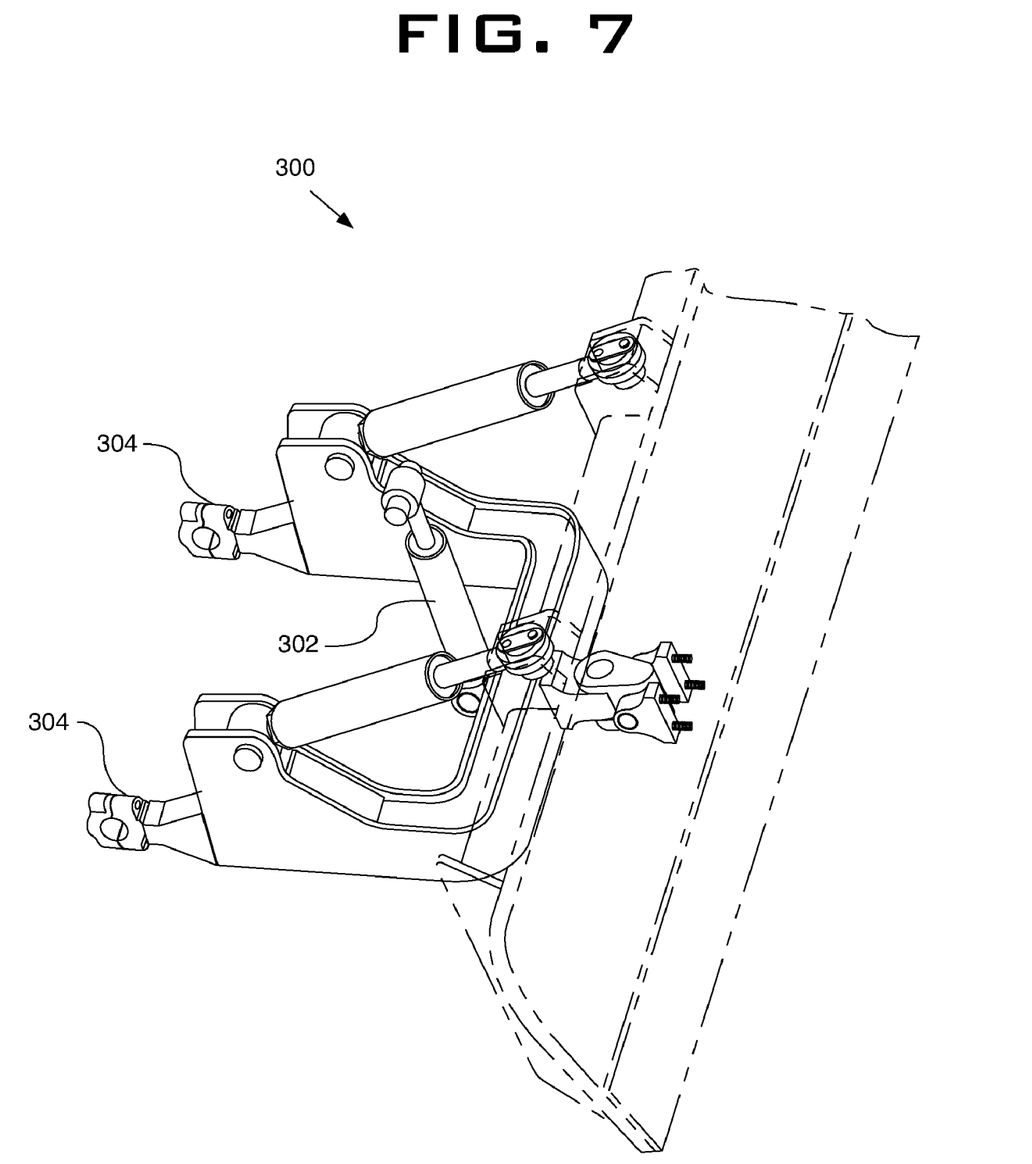
FIG. 7 is a perspective view of a variable pitch power angle and tilt blade system.

Referring to FIG. 7, a perspective view illustrates a example of a variable pitch power angle and tilt blade system or VPAT 300. As shown, the variable pitch power angle and tilt blade system 300 includes a lift hydraulic cylinder 302 that may be connected to the hydraulic cylinder mount 152 of the frame 102 (FIG. 2). The variable pitch power angle and tilt blade system 300 also includes couplings 304 that may be pivotally attached to the trunnions 184 (FIG. 5) to provide a machine in a VPAT configuration.

Consequently, a method for converting a frame 102 (FIG. 2) configured for use with a standard push arm system to a frame 102 (FIG. 5) configured for use with the variable pitch power angle and tilt blade system 300 may include removing the push arms 106 and the track roller frame 112 from the machine 100 (FIG. 1). The method may also include providing a frame 102 and providing an aperture 176 shaped to receive a trunnion 184 in the frame 102 proximate to a load transfer member 200. Further, the method may provide for attaching the trunnion 184 to the aperture 176, where the trunnion 184 is shaped to receive a variable pitch power angle and tilt blade system 300. The method may also include attaching the variable pitch power angle and tilt blade system 200 to the trunnion 184 and connecting the track roller frame 112 to the frame 102.

Therefore, to convert a frame 102 (FIG. 5) from being configured for use with the variable pitch power angle and tilt blade system 300 to a frame 102 (FIG. 2) configured for use with a standard push arm system, the trunnions 184 may be removed and the method discussed above followed in the reverse order.

INDUSTRIAL APPLICABILITY

In accordance with the disclosure above a lightweight frame that may be used with different implement configurations of a machine is provided. For example, the frame 102 illustrated in FIGS. 1-6 may be readily used in a track type tractor deployed in a standard push arm configuration or in a VPAT configuration by adding the trunnions 184.

A method for manufacturing the frame 102 may include providing the first and second plate members 130,132 that each includes the first opening 170 extending through the first and second plate members 130, 132 respectively. The method may also include attaching the inner cover plate 180 and the outer cover plate 182 to each of the first and second plate members 130, 132 in overlying relation to the first openings 170 to define the substantially hollow section and attaching a load support member to the inner sides 134 of the first and second plate members 130, 132. Further, the method may include attaching a load transfer member 200 to the load support member 144 and to the inner sides 134 of the first and second plate members 130,132.

Additionally, the method may include providing the aperture 176 shaped to receive the trunnion 184 in each of the first and second plate members 130, 132, providing a chamfer 186 around the aperture 176, and attaching the first and second trunnions 184 in the apertures 176 of the first and second plate members 130, 132 respectively. In attaching the first and second trunnions 184, the first and second trunnions 184 may be welded to the respective aperture 176 and the chamfers 186 filled with weld material 190.

It will be apparent to those skilled in the art that various modifications and variations can be made without departing from the scope or spirit of the invention. Additionally, other embodiments of the invention will be apparent to those skilled in the art from consideration of the specification and practice of the invention disclosed herein. It is intended that the specification and examples be considered as exemplary only.

What is claimed is:

1. A frame for a machine, the frame being configurable for use with a standard push arm system or a variable pitch power angle and tilt blade system, the frame comprising:
   a first plate member including an inner side and an outer side;
   a second plate member including an inner side and an outer side;
   a load support member attached to the inner sides of the first and second plate members; and
   a load transfer member attached to the load support member and to the inner sides of the first and second plate members, wherein the first and second plate members each include an aperture shaped to receive a trunnion, wherein the load transfer member is disposed proximate to the apertures, wherein the load transfer member is interposed between the apertures and intersects the apertures.

2. The frame of claim 1, wherein the apertures include a central axis and the load transfer member includes a central plane, wherein the central axis intersects the central plane.

3. The frame of claim 1, further comprising a trunnion disposed in each aperture, wherein the load transfer member is attached directly to the trunnion.

4. The frame of claim 1, wherein the load transfer member includes a gusset attached to the load support member and to one of the first and second plate members.

5. The frame of claim 1, wherein the load transfer member includes a mounting surface configured to be mounted to a bottom guard.

6. The frame of claim 1, wherein the first and second plate members each include a rear portion and a front portion, the front portions each including upward extensions that extend above the rear portions, the frame further comprising a cross member attached to the upward extensions of the first and second plate members.

7. The frame of claim 4, wherein the cross member includes two forward projecting arms configured to support a single hydraulic cylinder.

8. The frame of claim 1, wherein the first plate member includes a first opening extending from the inner side to the outer side, the frame including a first inner cover plate attached to the inner side of the first plate member in overlying relation to the first opening and a first outer cover plate attached to the outer side of the first plate member in overlying relation to the first opening, wherein the first plate member, the first inner cover plate, and the first outer cover plate define a substantially hollow portion; and wherein the second plate member includes a first opening extending from the inner side to the outer side, the frame including a second inner cover plate attached to the inner side of the second plate member in overlying relation to the first opening and a second outer cover plate attached to the outer side of the second plate member in overlying relation to the first opening, wherein the second plate member, the second inner cover plate, and the second outer cover plate define a substantially hollow portion.

9. The frame of claim 8, wherein the area of the first opening in the outer side of the first plate member is more than thirty percent of the total area of the outer side of the solid plate of the first plate member.

10. The frame of claim 8, wherein the area of the first opening in the outer side of the first plate member is more than forty percent of the total area of the outer side of the solid plate of the first plate member.

11. The frame of claim 8, wherein the area of the first opening in the outer side of the first plate member is larger than the remaining area of the outer side of the solid plate of the first plate member.

12. The frame of claim 8, wherein the first opening is comprised of a plurality of smaller openings separated by support material.

13. A method for manufacturing a frame for a machine, the frame being configurable for use with a standard push arm system or a variable pitch power angle and tilt blade system, the method comprising:
providing a first plate member and a second plate member;
attaching a load support member to the inner sides of the first and second plate members;
attaching a load transfer member to the load support member and to the inner sides of the first and second plate members; and
providing an aperture in each of the first and second plate members proximate to the load transfer member, the load transfer member being interposed between the apertures and disposed to intersect each aperture, wherein the aperture is shaped to receive a trunnion.

14. The method of claim 13, wherein the apertures include a central axis and the load transfer member includes a central plane, wherein the load transfer member is interposed between the apertures such that the central axis intersects the central plane.

15. The method of claim 13, further comprising disposing a trunnion in each aperture and attaching the load transfer member directly to the trunnion.

16. The method of claim 13, wherein the first and second plate members each include a first opening extending through the first and second plate members respectively, the method including attaching an inner cover plate and an outer cover plate to each of the first and second plate members in overlying relation to the first openings to define a substantially hollow portion.

17. A method for converting a frame configured for use with a standard push arm system to a frame configured for use with a variable pitch power angle and tilt blade system, the method comprising:
providing a frame configured for use with a standard push arm system, the frame including a pair of apertures in the frame proximate to a load transfer member, the load transfer member intersecting the apertures, wherein the apertures are shaped to each receive a trunnion; and
attaching the trunnion to the aperture, wherein the trunnion is shaped to receive a variable pitch power angle and tilt blade system.

18. The method of claim 17, further comprising attaching the variable pitch power angle and tilt blade system to the trunnion.

* * * * *